Patented Mar. 25, 1947

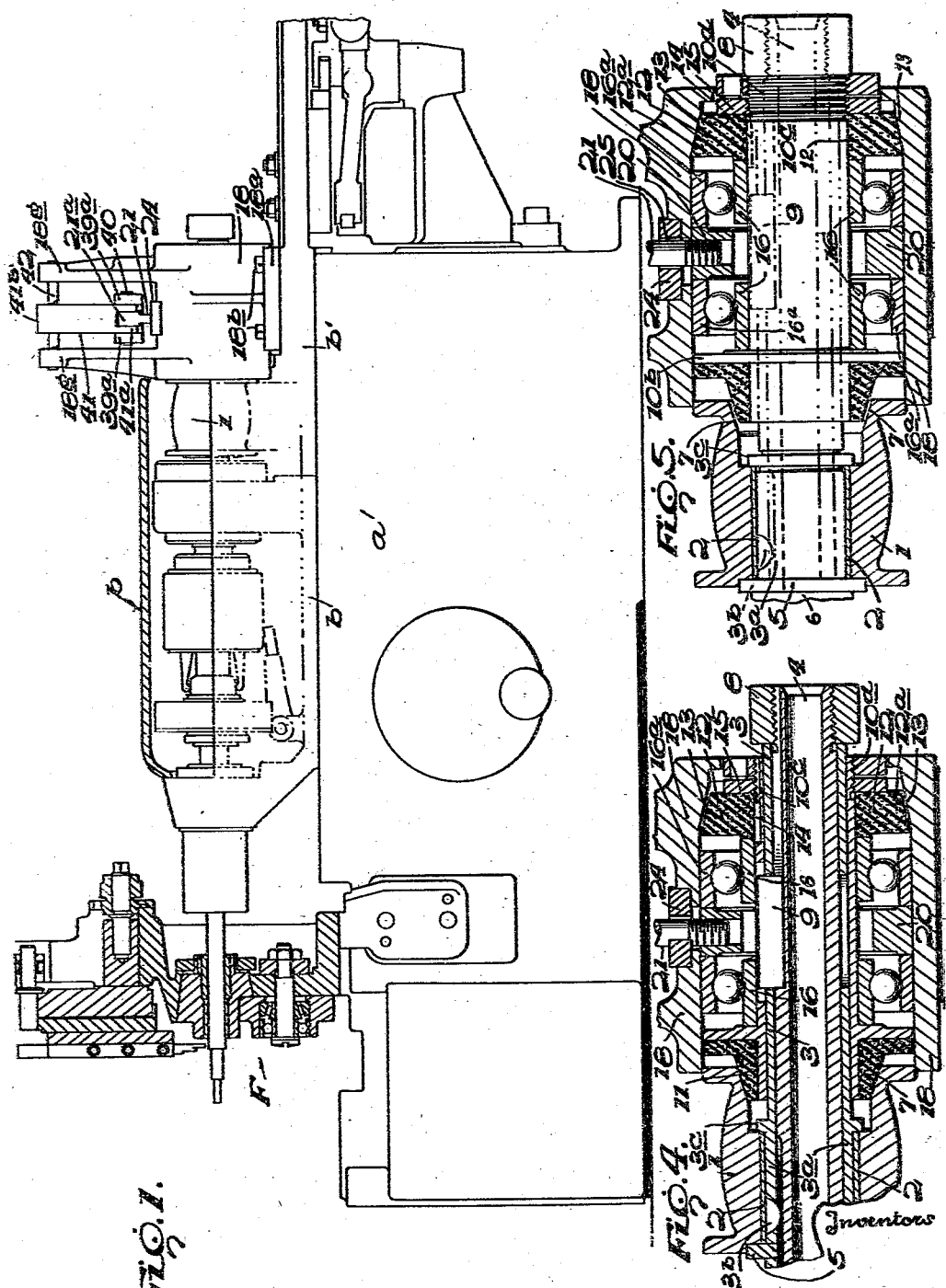

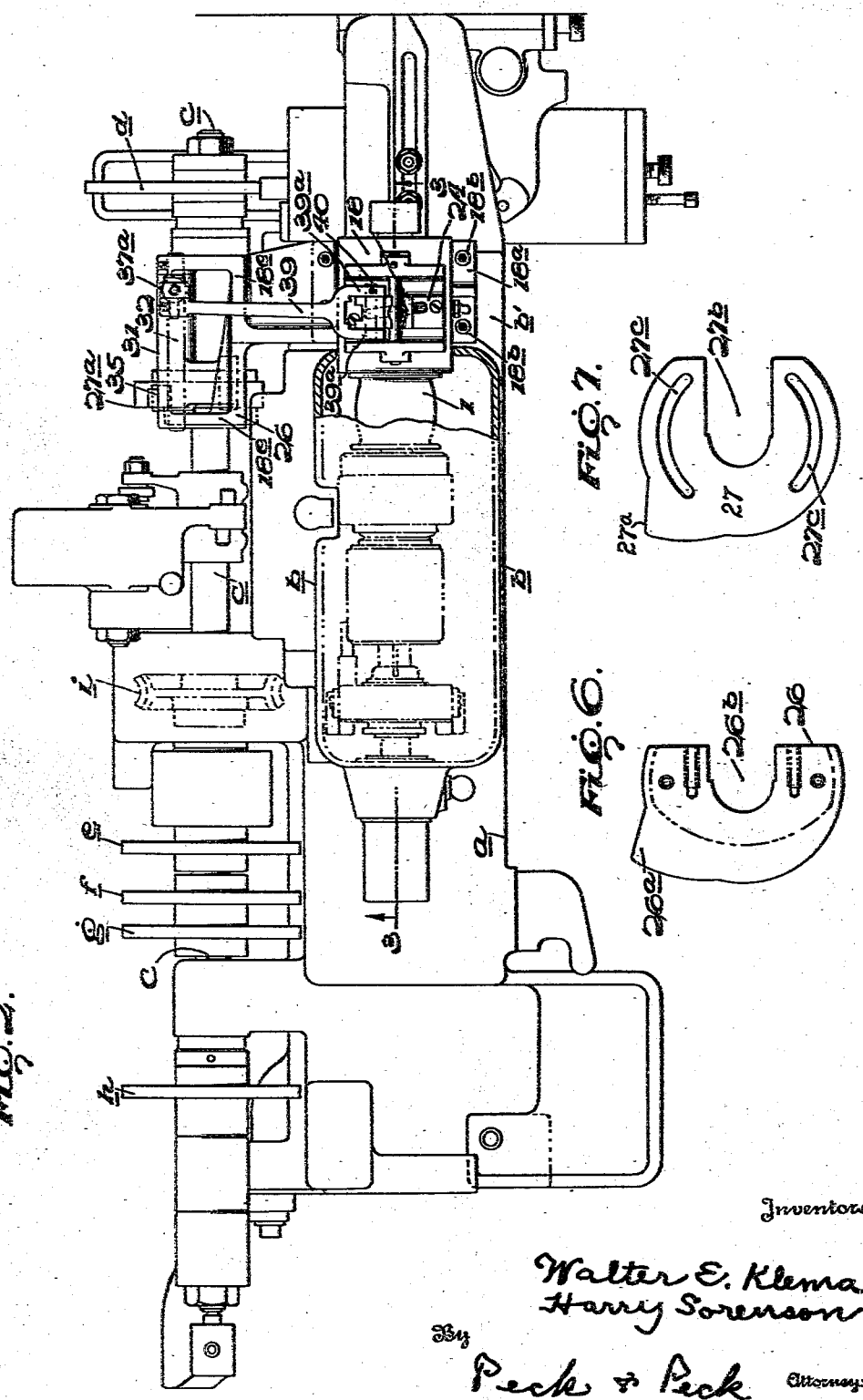

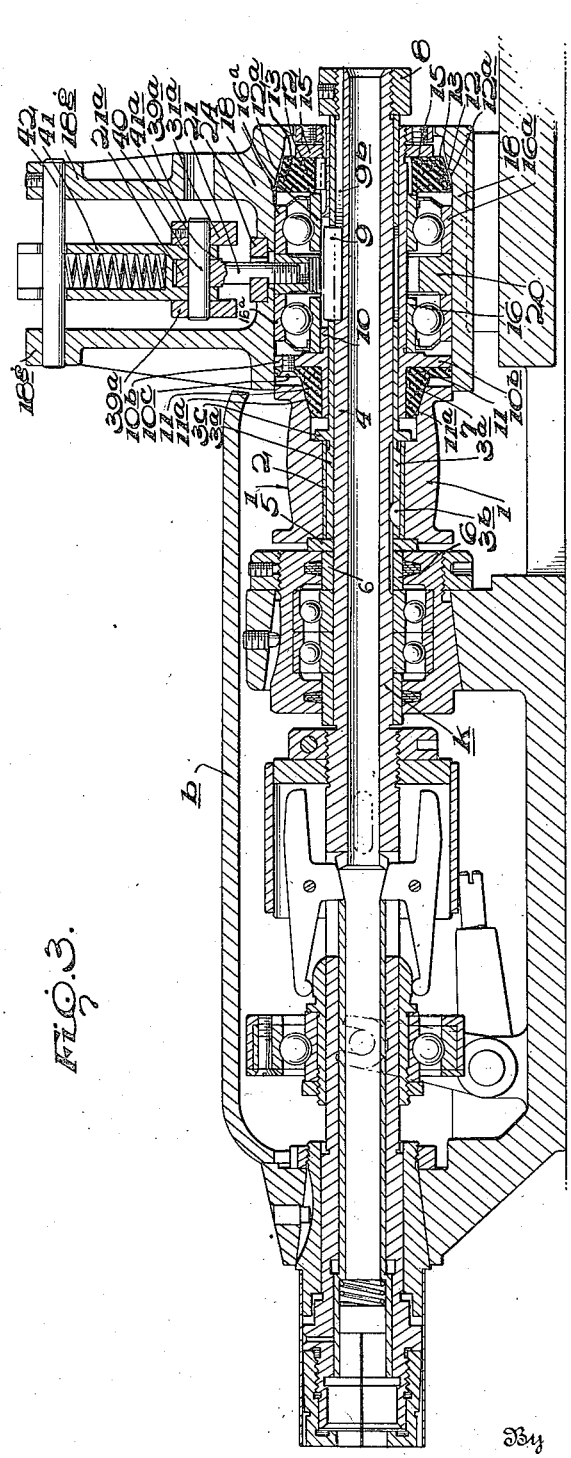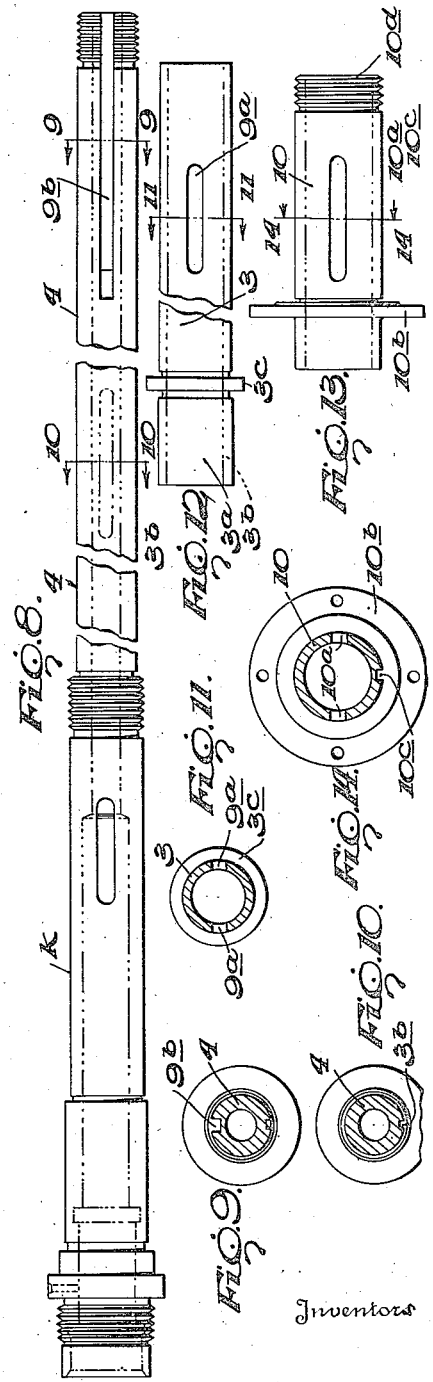

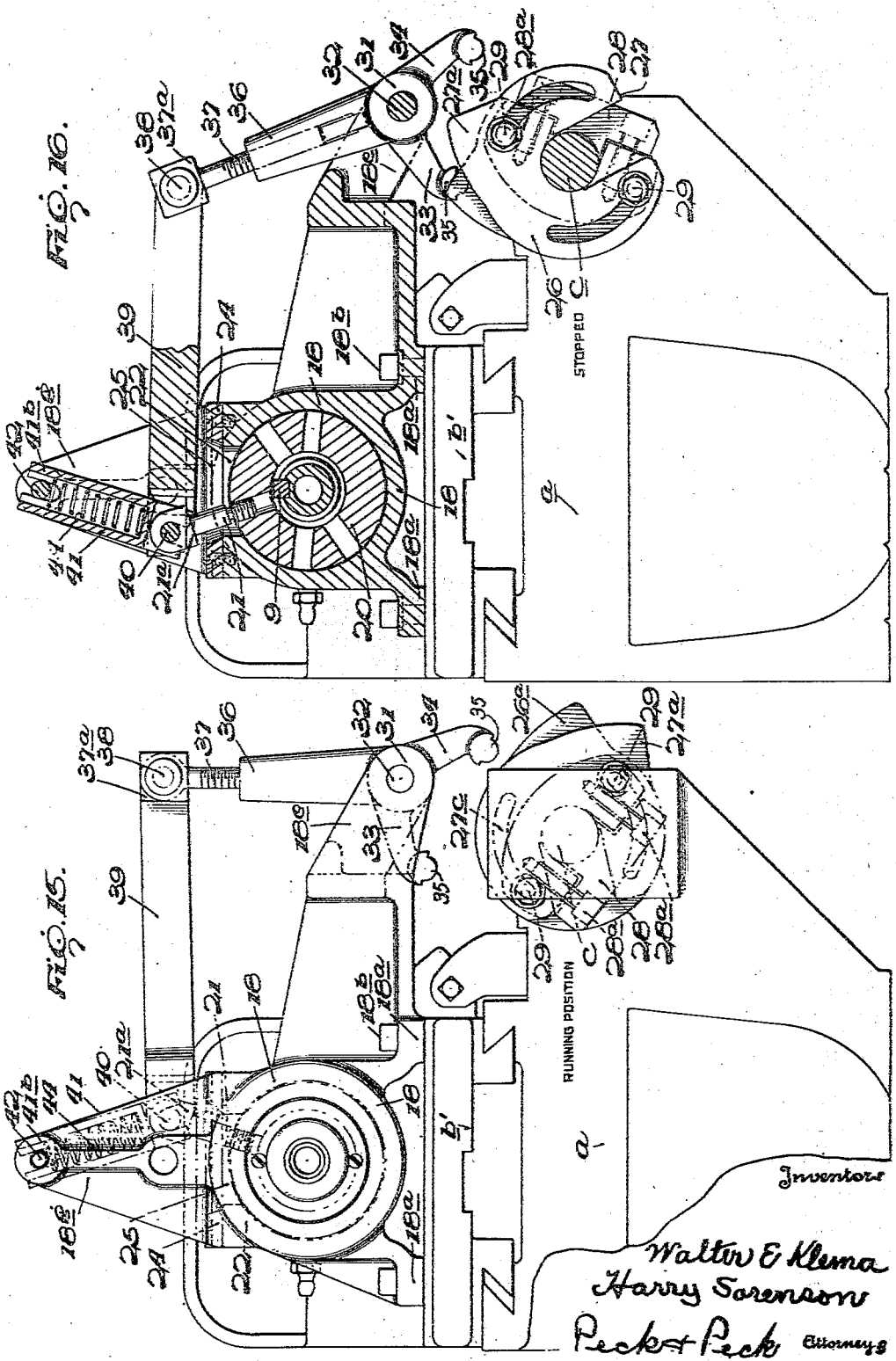

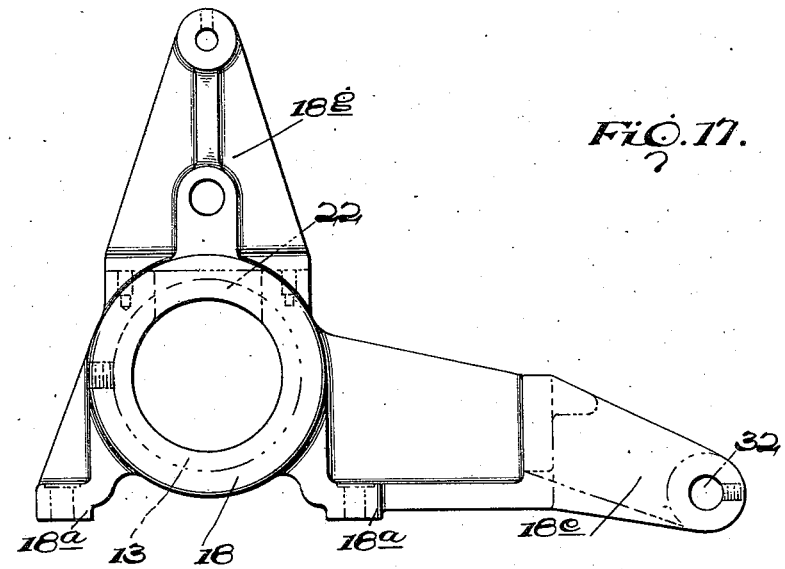
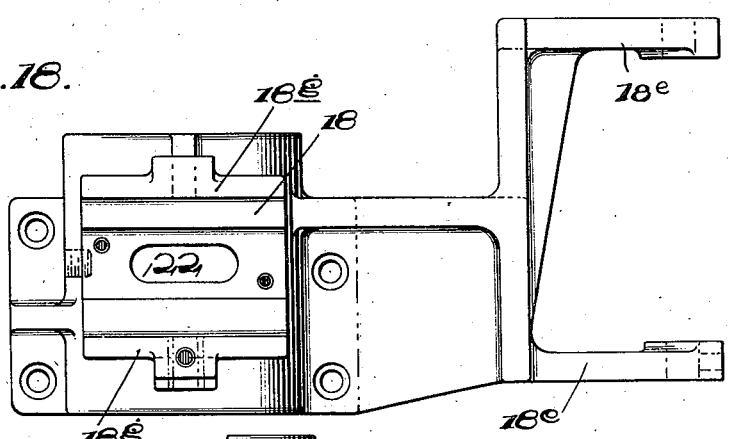
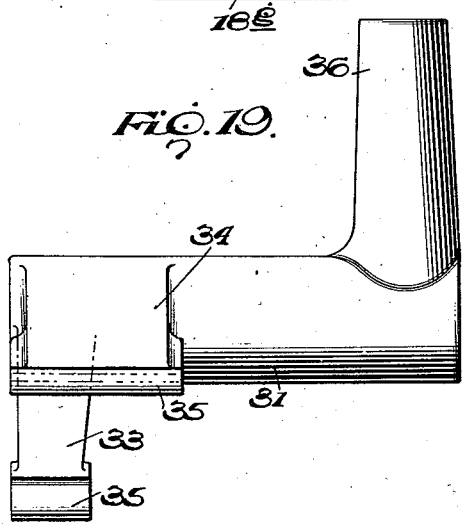
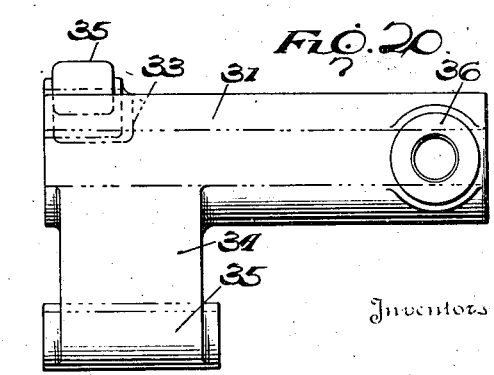

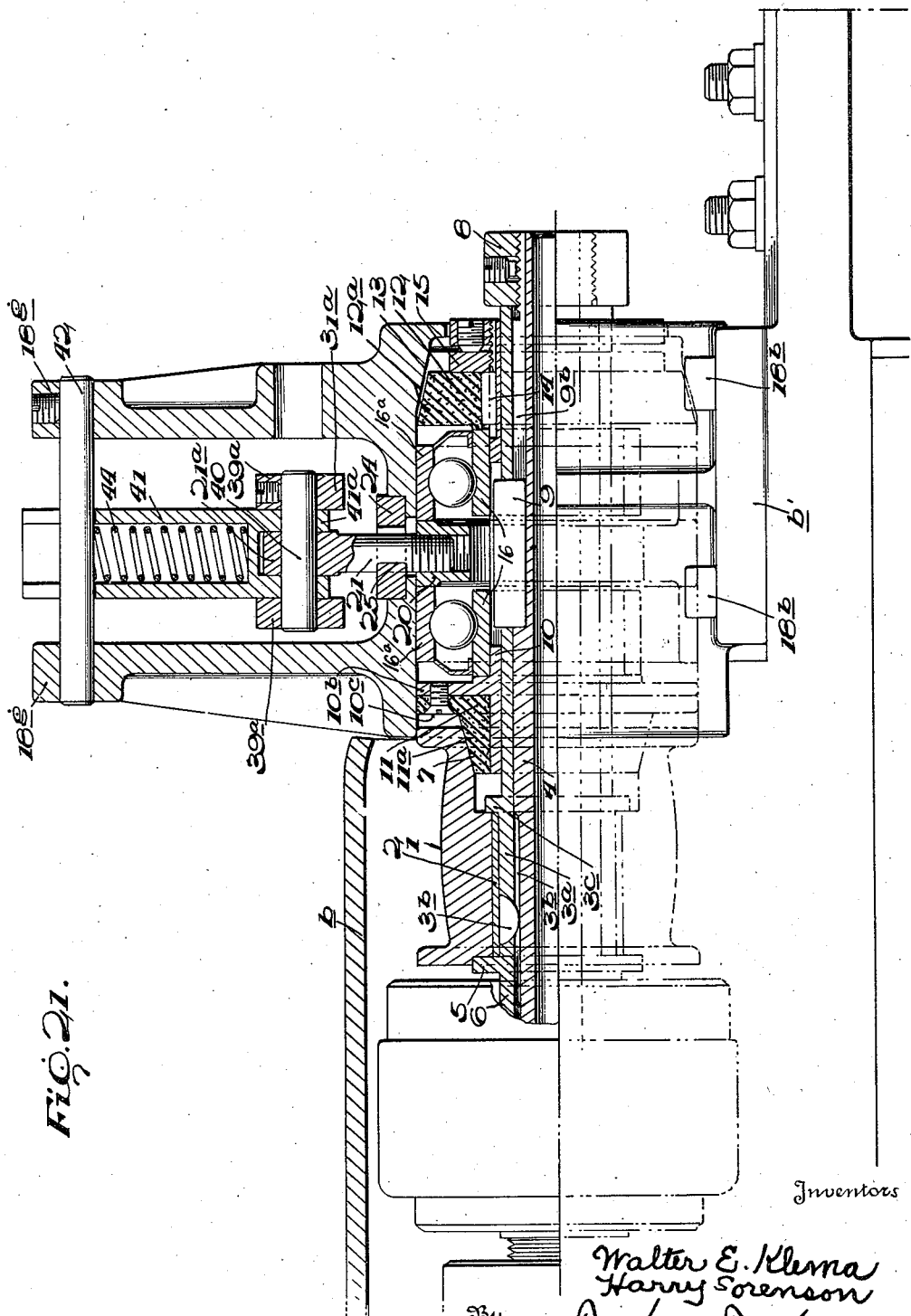

2,417,936

UNITED STATES PATENT OFFICE 2,417,936

AUTOMATIC SCREW MACHINE, AUTOMATIC LATHE, AND ALLIED AUTOMATIC MACHINE TOOL

Walter E. Klema and Harry Sorenson, Racine, Wis., assignors to George Gorton Machine Co., Racine, Wis., a corporation of Wisconsin Application March 24, 1944, Serial No. 527,978

11 Claims. (Cl. 82—30)

This invention relates to automatic screw machines, automatic lathes, and allied automatic machine tools; and the objects and nature of the invention will be made clear to those skilled in the art by the following explanations of a preferred example embodiment illustrated by the accompanying drawings from among other constructions, embodiments, and examples within the spirit and scope of the invention.

Automatic machines of this type are in general use in this country. These machines embody a bed or base on which a spindle casing or headstock is slidably mounted for straight-line longitudinal relatively short-stroke movements toward and from the cutting tool head or station. The work spindle is longitudinally hollow for the longitudinal reception and feeding of the bar stock therethrough, while usually said stock is rotated by and with said spindle. This spindle extends centrally and longitudinally of the casing or headstock and is carried thereby and rotatably mounted therein, and is characterized by the fact that said spindle is continuously rotated during the various machine operations on the stock bar (the work) such as turning, drilling, tapping, cutting off, etc.

In these automatic machines of commerce, said spindle is driven and rotated by a circular driving member, such as a gear or pulley, keyed thereto to constantly rotate therewith, and this member is driven by a suitable source of power, such as the main drive shaft of the machine, through the medium of a suitable variable speed drive, in timed relation to other driven parts of the machine.

Suitable settable variable stroke and timing mechanisms are provided for actuating the headstock or spindle casing on its straight-line feeding movements toward and from the cutting tool station or frame, all in timed relations to other moving driven parts of the machine.

These automatic machines of commerce, are also characterized by the provision of a driven rotary cam shaft sometimes located longitudinally of the machine at the far or rear side of the machine parallel with the spindle, and carrying cams actuating rocker or leverage devices for controlling and timing the operation of various machine operations and movements. This cam shaft is driven from the main drive shaft of the machine through the medium of suitable timing and variable speed drive mechanisms.

It is an object of the instant invention to provide such automatic machines of commerce and others of this more or less general type, with automatically controlled mechanism whereby the rotary stock bar feeding spindle can be temporarily locked or held against rotation for a predetermined length of time, during each operating cycle; i. e., each spindle rotation, to permit abnormal tool operation on the work, such as to mill or otherwise produce a flat on the work or to perform any other operation that cannot be carried on while the work is rotating.

A further object of the invention is the provision of rotary spindle locking and releasing means, with cam-controlled settable mechanism for automatically actuating said means for timing the locking and releasing of said spindle, and the duration of the periods during which said spindle is locked against rotation, and then released for continued rotation.

And another object of the invention is the provision in automatic lathes or so-called screw machines of settable and controlled mechanism whereby the stock bar feeding and rotating spindle can, during each rotation or operating cycle, be held locked against rotation for a predetermined length of time, and then released for continued rotation for completion of the desired work piece.

With the foregoing and other objects in view, developed by the following specification, the invention consists in the concept of the problem and the solution by certain novel structures, combinations, and sub-combinations as more fully explained hereinafter, and specified by the appended claims.

Referring to the accompanying drawings, forming a part hereof:

Fig. 1 is a more or less diagrammatical side elevation of portions of an automatic lathe or so-called screw machine, say of the Jos. Petermann type in more or less general use in this country and well known to those skilled in the art; showing partially in vertical section, portions of the instant invention applied and adapted to said machine.

Fig. 2 is a more or less diagrammatical top plan view of the organizations of Fig. 1, also disclosing portions of the instant invention included in said automatic machine of commerce.

Fig 3 is a longitudinal vertical section taken approximately on the dotted line 3—3, Fig. 2.

Fig. 4 is a enlarged detail longitudinal vertical section taken approximately in the plane of Fig. 3, showing the spindle locking and releasing mechanism at its limit of movement toward the left with the rotary spindle in driven relation to the rotary driving member, here shown in the form of a pulley.

Fig. 5 shows the organization of Fig. 4, with the spindle locking and releasing mechanism at its limit of movement toward the right or rearwardly, locking the spindle against rotation, leaving the pulley free to rotate or idle with respect to the spindle.

Fig. 6 is a detail side elevation of one of the cam plates on the cam shaft for actuating rocker means for propelling the spindle lock and release means in one direction.

Fig. 7 is a detail side elevation of the adjustable cam plate carried by the cam plate of Fig. 6, for actuating means for propelling the spindle lock and release means in the opposite direction.

Fig. 8 is a detail side elevation of the tubular rotary spindle.

Fig. 9 is a cross section of the spindle on dotted line 9—9, Fig. 8.

Fig. 10 is a cross section on line 10—10, Fig. 8.

Fig. 11 is a cross section of the spacer sleeve, taken on the line 11—11, Fig. 12.

Fig. 12 is a detail side elevation of the spacer sleeve.

Fig. 13 is a detail side elevation of the clutch cone sleeve.

Fig. 14 is a cross section of the clutch cone sleeve taken on the line 14—14, Fig. 13.

Fig. 15 is an approximate end elevation of the right hand end of the organization Fig. 1, with the spindle lock and release controlling cams and actuating mechanisms as positioned when the spindle cone-clutch or lock and release sleeve is at its limit of movement in one direction.

Fig. 16 is an end view partially in vertical section, of the organization of Fig. 15, when said spindle lock and release sleeve is at its limit of movement in the opposite direction.

Fig. 17 is a detached end elevation of the rigid supporting bracket attached to the spindle casing or headstock housing the sleeve means on the spindle, and carrying the cam actuated rocker means and toggle mechanism.

Fig. 18 is a detached top plan of said bracket.

Fig. 19 is a detached top plan of the rocker or bell crank lever carried by the rearwardly projecting rigid arms of the bracket of Figs. 17 and 18.

Fig. 20 is a detached end or side elevation of said rocker.

Fig. 21 is a detail central vertical section, partially in side elevation, taken in the plane of the sectional view Fig. 3, but enlarged to more clearly illustrate details.

As an example, we disclose a preferred embodiment of our instant invention built in or applied to a Petermann type of automatic lathe or so-called screw machine, for example, in general use in this country and known to those skilled in the art, particularly a machine of this type known as "Gorton 16-A Automatic" manufactured and sold by George Gorton Machine Co., Racine, Wisconsin.

However, we do not wish to limit our instant invention to use in or on such particular machines, as we wish to cover such invention in or on any automatic type lathe or screw machine to which the instant invention is capable of adaption.

The instant invention is characterized by the provision of longitudinal clutch-controlling sleeve means concentric with the rotary stock-bar-feeding spindle and rotating therewith, and provided with clutch members, one for cooperating with a complementary clutch member of the spindle rotary driving element such as an idler driving pulley, and the other for cooperating with a complementary clutch member of a relatively fixed part of the machine; said sleeve means being relatively longitudinally movable with respect to said spindle, in one direction to lock the sleeve means to said pulley for rotating the sleeve means and said spindle, while freeing the other clutch member of said sleeve means from said fixed clutch member, said sleeve means being longitudinally movable in the opposite direction to free said means from said pulley for pulley idler rotation, while holding said means and the spindle against rotation by locking engagement of a sleeve means clutch member with said complementary fixed clutch member, during each complete rotation of the work spindle.

These relative back and forth longitudinal movements of said sleeve means are preferably quick-acting and usually only of sufficient length to operatively engage one set of complementary clutch members while operatively disengaging the opposite set of complementary clutch members.

The provision of settable means for automatically timing, actuating and controlling the back and forth movements of said clutch-controlling sleeve means, is also a characteristic of the instant invention.

In the instant embodiment illustrated as one example, constantly rotating adjustable settable cam means, are provided for controlling and actuating said back and forth movements of said cam means, through the medium of suitable movement transmissions, such as rocker and push and pull or toggle connections actuating means for converting rotary movement about the longitudinal axis of said spindle into movements of said sleeve means longitudinally of said axis.

Referring to the particular example embodiment disclosed by the accompanying drawings, the standard machine of commerce, shown in part, comprises the base or bed $a$, on which the rotary work spindle casing or headstock $b$, is mounted for longitudinal longitudinal reciprocation toward and from the cutting tool station or frame F, Fig. 1, for feeding the stock bar forwardly toward said station as is well understood by those skilled in the art.

The rotary cam shaft $c$, of this example automatic machine of commerce, is arranged longitudinally of the machine, in this example, parallel with the longitudinal axis of the headstock, and is suitably rotatably mounted to the rear of the machine, and is suitably driven from the machine main drive, usually through the medium of a variable speed control, at a speed that bears a suitable relation to the speed of the work spindle.

This cam shaft $c$, of said automatic machine, carries and rotates various work-performing cams. For example, cam $d$, in this particular example, controls the longitudinal feeding and return movements of the headstock $b$, and the rotary spindle mounted therein and carried thereby, through the medium of suitable transmissions and settable means common in the art.

We also show the cam shaft equipped with various other cams normally rigid therewith and rotated thereby, and common in this art. We show, for instance, separate cams $e$, $f$, $g$, and $h$, that through the medium of various mechanisms control means that predetermine the diameters of the work to be produced, through control of the positioning and feed of work cutters and other parts and by control of cutting off means, all broadly common in the art.

These cams are set to operate in proper sequence with each other, to perform the desired work in each machine cycle; i. e., each complete revolution of the rotary cam shaft.

The cam shaft $c$, is driven by a suitable driving transmission $i$, indicated in part by dotted lines, Fig. 2.

The longitudinal portion $k$, of the longitudinally-hollow or tubular rotary spindle, forwardly (to the left Fig. 3) from the circular driven element or pulley 1, is in effect the standard spindle of said automatic machines of commerce, and is rotatably mounted in the headstock or casing $b$, in longitudinal axial alinement with the tubular stock bar or work supporting sleeve of the fixedly supported cutting tool supporting frame of said machine of the prior art. This spindle is longitudinally hollow to receive and carry the stock bar and to periodically feed the same forward into said fixed sleeve of said tool supporting frame, all as in said prior art machines. Said spindle is, in this example equipped with the various mechanisms of said prior art machines, to attain the results desired, with longitudinal feeds accomplished by feeding the headstock forward as a unit, while the work stock bar, is held gripped by the rotary spindle collet in the usual manner. Suitable cam means on the rotating cam shaft $c$, for instance, cam $d$, controls these headstock back and forth movements. These back and forth movements of the headstock are timed or synchronized with the rotary movements of other cams on said cam shaft controlling the operative movements of the cutting tools and other parts to generate the desired shapes and sizes of the work cut from the bar stock.

In the illustrated example embodiment of the instant invention, the spindle driving element, for instance, pulley 1, is not directly keyed to the spindle to constantly rotate therewith.

This pulley 1, in this example, is provided with an internal bearing sleeve 2, that rotates therewith.

This sleeve 2, is mounted for free rotation on the front cylindrical end 3a, of a spacer sleeve 3 (Fig. 12), longitudinally and concentrically located on the rear cylindrical portion 4, of the rotary work spindle of Fig. 8.

If so desired, an oil hole 3b, can be provided extending radially through said sleeve end 3a, within the pulley bearing sleeve 2, for lubrication distribution. The pulley 1, is confined on said rear end 3a, of sleeve 3, for free rotation between exterior annular flange 3c, of sleeve 3, and a washer 5, and stop collar 6, fixed on the rotary work spindle at the front end of the pulley.

The bore of the rear end of pulley is enlarged to receive the flange 3c, of sleeve 3, and to provide a rearwardly enlarging internal overhanging concentric conical or tapered frictional clutch member face or surface 7.

The sleeve 3, concentrically located on and surrounding the rotary work spindle 4, extends through pulley 1, and rearwardly therefrom to the rear end of the spindle 4, and there is stopped against relative rearward movement by lock or stop nut or sleeve 8, located on the exteriorly screw threaded rear end of said spindle. The spacer sleeve 3, is locked to the spindle 4, against relative rotary movements on their common longitudinal axis by the key 9, extending through longitudinal slot 9a, in said sleeve and fitting in the longitudinal key way or groove 9b, in the rotary spindle 4, preferably extending longitudinally thereof through its rear end.

On the rear end portion of the spacer sleeve 3, is concentrically mounted a clutch cone sleeve 10, (Fig. 13), surrounding said portion of sleeve 3, and having a limited range of relative longitudinal sliding movement on sleeve 3, and with respect to the same and the spindle 4, although this sleeve rotates with sleeve 3, and work spindle 4.

The sleeve 10, is formed with a longitudinal key slot 10a (elongated with respect to slot 9a, in sleeve 3) to receive key 9, and thus cause rotation of the two sleeves with the work spindles, while permitting limited relative longitudinal movements of sleeve 10.

The cylindrical front end of this sleeve 10, fixedly carries a surrounding hard frictional-material cone-clutch member 11, in the form of a ring concentric with said sleeve and in longitudinal axial alinement with pulley 1, and providing a forwardly reducing tapered or cone clutch surface 11a, complementary to the oppositely tapered cone clutch member 7, formed by the pulley bore, whereby the pulley can be locked to drive and rotate said sleeve 10, when clutch member 11, is moved forwardly to force its cone 11a, into tight engagement with clutch member 7, and said pulley can be released for idling rotation when clutch member 11, is moved rearwardly from operative engagement with member 7.

The sleeve 10, provides a rigid annular surrounding flange 10b, that backs said clutch member ring 11, and to which it is secured by any suitable means, for example, screws 10c.

At its opposite or rear end, the sleeve 10, carries another surrounding concentric clutch member 12, normally rigidly fixed to said sleeve, and composed of a hard frictional material ring providing a longitudinally and rearwardly reducing tapered or cone clutch face 12a, complementary to a rigid cone-clutch member or surface 13, rigid with a fixed part of the machine, as will be more fully explained hereinafter.

The clutch ring or member 12, is preferably locked to the sleeve 10, against relative circular movement on the longitudinal axis of the sleeve by key 14, fitting in longitudinal key way 10c, in the sleeve 10.

In the example shown, the rear end 10d, of sleeve 10, is longitudinally and exteriorly screw threaded to adjustably receive a stop and clamping nut and adjusting means 15, for clamping or pressing the clutch ring 12, longitudinally rearwarly tightly against the inner circular raceway sleeve 16, of a ball bearing surrounding sleeve 10.

Duplicate ball bearings surround the forward portion of sleeve 10, with their inner circular raceway sleeves 16, fitting around said sleeve and abutting the rear side of the rigid flange 10b, thereof, all as more fully explained hereinafter.

To house and support the spindle and its bearings and the sleeve means, located rearwardly (toward the right Fig. 3) beyond the spindle driving pulley 1, we add to the automatic machine of commerce, a main supporting bracket (Figs. 17 and 18) that includes an elongated approximately cylindrical strong longitudinally-hollow hub, casing or housing 18, and upstanding and lateral stiff arms 18g and 18e, respectively, rigid with and projecting approximately radially from said hub 18, for supporting various operating parts.

This bracket is formed with base 18a, seated on the depressed tail or rear end b' of the headstock b and fixedly secured thereto, as by bolts 18b.

With the supporting bracket thus secured, the hub or longitudinal housing 18, is longitudinally alined with common longitudinal axis of the rotary work spindle and the headstock casing and forms a longitudinal extension of said casing rearwardly from the pulley 1, that encloses the sleeve means and spindle supporting bearings.

The fixed hub 18, preferably provides an internal smooth cylindrical surface throughout its length, approximately to its rear end, where the internal diameter of the hub is contracted by the rigid annular tapered or conical rigid clutch member surface 13, hereinbefore mentioned. The outer non-rotatable annular raceway rings or sleeves 16a, of the two ball bearings slidably fit the smooth cylindrical inner surface of the hub 18, for movements under pressure longitudinally of said smooth cylindrical surface.

The two longitudinally alined similar ball bearings 16, are mounted on and surround the cone-clutch sleeve 10, and are held thereto against relative longtiudinal movements, and, in this particular example, said sleeve 10, is propelled on its longitudinal movements to lock the spindle against rotation, or to lock the sleeve and spindle to the pulley 1, for driving rotation of the spindle, through the medium of non-rotary raceway rings of said two bearings for example, rings 16a, thereof.

In this example, said two parallel ball bearings, are spaced a distance apart, to receive an intervening concentric longitudinally-alined longitudinally-propelling ring 20, having opposite side parallel faces that abut the adjacent parallel end faces of the outer raceways 16a, of said ball bearings. Thus, if force is longitudinally applied to said ring 20 to move the same toward the left (Fig. 4) the lateral engagement of said ring with the left hand ball bearing will move the same and the cone clutch sleeve to the left bringing the complementary clutch members 7, 11, into operative engagement, and the complementary clutch members 12, 13 out of operative engagement.

Longitudinal force applied to propelling ring 80, in the opposite direction, will force the right hand ball bearing (Fig. 5) to the right, and cause operative separation of spindle driving clutch members 7, 11, and operative engagement of the spindle locking clutch members 12, 13.

This longitudinally-propelling ring 20, for the cone-clutch sleeve 10, is actuated on its sleeve propelling movements, in this example, by a stiff strong stud or arm 21, rigid with said ring 20, and projecting upwardly and radially therefrom through and upwardly beyond a slot 22, in the top wall of the hollow casing or hub 18. This slot 22 in length is arranged transversely with respect to the longitudinal axial line of the hub 18, and its opposite closed ends limit the range of movement of the ring actuating stud 21, when rotating the ring 20, on the common longitudinal axial line of the sleeve means and spindle. Thus the ring 20, is rotatable on said axial line with respect to the two similar sets of ball bearing, under the rotating propulsion of stud or arm 21. However, to attain longitudinal cone-clutch sleeve movements, under the urge of the propelling ring 20, various means can be provided to convert the rotary motion of the ring into straight-line forcing movements in either longitudinal direction on the cone-clutch sleeve. Merely as an example, we provide the elongated slot 22, of a width much greater than the exterior dimensions of the portion of propelling arm or stud 21, located between the parallel straight longitudinal edge walls of said slot.

On the top face of the hub 18, we fix a plate 24, over and extending longitudinally of said relatively wide slot 22, and provided with a straight diagonal relatively-narrow laterally wedging slot 25, extending longitudinally of said plate and slot 22.

The ring propelling stud or radial arm 21, more or less snugly and slidably fits the straight longitudinal edge walls of said laterally wedging slot. Thus, as the arm 21, is moved in one direction to rotate ring 20, the diagonal slot 25, will wedge said arm and the ring 20, laterally and thereby force ring 20, longitudinally to force the cone-clutch sleeve longitudinally in one direction. When the arm 21, is swung in the opposite direction, the diagonal slot 25, will wedge and force the arm 21, in the opposite direction and thereby force the cone-clutch sleeve longitudinally to its limit of movement in that direction. In this particular example, the cone-clutch sleeve has no dead or intermediate position, as it is either in position locking the pulley 1, in operative driving relation to the sleeve means and spindle, or the opposite position operatively disengaged from the pulley, which can then idle, and locking the sleeve means and spindle against rotation.

In this example embodiment, cam means are provided on and rotating the cam shaft c, together with transmission means actuated and controlled by same cam means, and operatively connected to the actuating arm or stud 21, of the cone-clutch sleeve propelling ring 20, to swing said arm to lock the spindle against rotation and then to release the spindle and restore the rotation thereof on each complete rotation of the constantly rotating cam shaft, while maintaining the spindle locked against rotation for a predetermined length of time during each cam shaft rotation or cycle.

In this particular example, the cam means, comprises two flat disk-like parallel cam plates 26, 27, (Figs. 6-7) centered on and normally fixed to each other and to the cam shaft. The main cam plate 26, is formed with a radially-projecting usually-tapered high point 26a, and cam plate 27, is likewise provided with a substantially similar radially projecting taper high point 27a, and both cam plates provide preferably smooth circumferential contacting edges that include said high points.

The main cam plate 26, is radially slotted at 26b, to radially slip onto and center on the cam shaft c, and to be rigidly clamped thereto and centered thereon by clamping block 28, and appropriate clamping screws 28a. The flat cam plate 27, is also provided with a radial slot 27b, whereby said plate can be slipped laterally on the cam shaft and centered thereon beside the main cam plate 26, with the flat adjacent sides of said plates contacting. These cam plates are angularly adjustable with respect to each other on the cam shaft as a center, to vary the angular positions of the high points 26a, 27a, to increase or reduce the arcuate distance or number of degrees between said points to thereby increase or reduce the length of time that the work spindle is locked against rotation during each spindle cycle or rotation.

Thus, in the particular example disclosed, the adjustable cam plate 27, is formed with arcuate slots 27c, concentric with cam shaft c, and clamping screws 29, extend through said slots and are threaded into main cam disk 26, to clamp the two disks tightly together in the angular positions to which adjusted when the screws 29, are loosened.

In the particular example embodiment disclosed, the transmission means actuated and controlled by the cam means 26, 27, for actuating the operating arm or stud 21, of the ring 20, at timed intervals, includes a bell crank lever or rocker having a horizontal longitudinally elongated barrel, bearing or hub 31, (Figs. 19–20) located to the rear of the machine parallel with and spaced a distance above that portion of the cam shaft c on which is located the cam means 26, 27.

This barrel 31, is mounted on and supported by a horizontal longitudinally elongated cylindrical usually-fixed pin or shaft 32, extending between and supported by a pair of laterally-spaced rigid stiff arms 18e, rigid with the hub or barrel 18, of the main supporting bracket and projecting rearwardly from barrel 18, usually with their rear ends depending toward the cam shaft c. The barrel 31 is formed with a pair of stiff downwardly-diverging arms 33, 34, rigid therewith and approximately radiating therefrom approximately at right angles to each other. Each arm 33, 34, at its lower end, is provided with a cam contacting surface 35. During the oscillations of the bell crank 31, 33, 34, these contact surfaces are alternatively brought into the circular paths of movement of the high points 26a, 27a, of the rotating cams 26, 27, for swinging the bell-crank first in one direction and then in the opposite direction. Thus, if contact 35, of the bell-crank arm 33, is located in the path of movement of the high point 26a, of cam 26, once on each complete revolution of said cam, said arm 33 will swing upwardly or be elevated by said high point 26a, to oscillate the bell crank including its barrel toward the right or clockwise, and thereby swing arm 34, to bring its contact surface into the path of movement of the high point 27a, of revolving cam 27, angularly positioned the desired number of degrees from high point 26a, of cam 26. When high point 27a, strikes the contact of arm 34, said arm will be swung laterally toward the right to oscillate the bell crank and its barrel in an anti-clockwise direction, which movement again swings arm 33, downwardly to bring its contact 35, into the path of movement of the advancing high point 26a, of rotating cam 26.

The bell crank 31, 33, 34, includes a stiff elongated lever arm 36, rigid with the barrel 31, and radially projecting upwardly therefrom, and utilized in this example, for transmitting the oscillations of the bell crank actuated by the rotating cams, to the means for locking the work spindle against rotation, and for releasing the same for rotation. If so desired, means can be provided for varying the effective length of the motion transmitting arm 36. For example, we show said arm with a longitudinal internally screw threaded socket longitudinally receiving a stiff extension stud 37, having a longitudinal screw thread complementary to that of said socket.

The upper end of this longitudinally adjustable extension stud is usually, if so desired, in the form of a flat head 37a, having a transverse bearing hole or bore extending therethrough that receives the lateral or transverse pivot or bearing pin 38, that pivotally unites said head 37a, and the rear end of a stiff strong push and pull link 39. This link is horizontally arranged above the hub 18, and extends forwardly from upstanding lever arm 36, 37, to the transverse pivot pin 40, constituting the pivotal joint of a vertically disposed toggle.

The lower upright leg of this toggle is formed by the upstanding actuating stud or arm 21, of the cone-clutch sleeve propelling ring 20.

The toggle pivot pin 40, extends transversely and more or less loosely through a transverse eye or bearing 21a, rigid with the upper end of arm or stud 21.

The upper upright bar or link 41, of said toggle, is, in this example, formed by a strong stiff elongated bar forked at its lower end 41a, to more or less loosely receive and straddle the upper end eye of arm or stud 21 and to straddle, center and have bearing on the toggle pin 40, at each side said eye, and within or between the forked front end 39a, of the push and pull link 39, receiving and usually fixed to the cross pivot pin 40, of the toggle.

The upper end of the toggle member 41, is forked or slotted from its end extremity downwardly, at 41b, to straddle and pivot on a fixed longitudinally elongated elevated horizontal or transverse pin 42, extending between and fixed to the upper ends of stiff strong laterally-spaced vertical posts or arms 18g, rigid with the opposite end portions of the hub 18, of the supporting bracket and upstanding therefrom.

The upper toggle member 41, is hollow through a portion of its length to form a housing for a coiled expansion spring 44, bearing at its upper end against cross pin 42, and at its lower end against the closed lower end of the member 41, and this spring is preferably under constant expanding tension to urge the toggle member longitudinally downwardly.

The toggle member 41, and the spring 44, are preferably slidable laterally longitudinally of the cross pin 42, under lateral pressure of the actuating arm or stud 21, of ring 20, while forcing the cone-clutch sleeve longitudinally with respect to the barrel 18, and rotary work spindle.

It will be noted that the members 21, 41, and their mountings, form a toggle that will be broken and snapped rearwardly beyond dead center by the rearward pull of link 39, under the force of the rearward swing of lever arm 36, 37, when the bell crank lever is rocked clockwise by the elevation of lever arm 33, by the impelling action of the high point 27a, of cam 27, as in Fig. 15. This action of the toggle swings the stud or arm 21, or ring 20, rearwardly, and longitudinally moves and holds the cone-clutch sleeve in spindle revolving operative contact with the driving pulley 1. When the parts are in this position as well as when in the position of Fig. 16, the spring 44, exerts constant tension on the cone-clutch slide to maintain either set of contacting complementary clutches in tight engagement. When the cone-clutch sleeve has been held the predetermined length of time in the position requiring work spindle rotation, the high point 26a, of the constantly revolving cam 26, will move into contact with the free end contact surface of bell crank lever arm 34, and force said arm rearwardly and upwardly or counter-clockwise, and thus rock the bell crank to again lower arm 33, and to force upstanding lever arm 36, 37, and push and pull link forwardly to forwardly break toggle 41, 21, forwardly past the dead center to the positions shown by Fig. 16, thus forcing the stud or arm 21, of ring 29, forwardly to its limit of forward movement and thereby forcing the cone-clutch sleeve from its position requiring rotation of the work spindle to its position holding the complementary clutch members 12, 13, in tight operative engagement locking the work spindle against rotation and leaving the pulley 1 free to idle with respect to said spindle.

The work spindle, during each complete cycle or rotation of the cam shaft will be thus held against rotation for the predetermined length of time, before the rotating cam 27, again brings its high point 27a, into operating lifting contact with elbow lever arm 34, to again throw the parts into the positions of Fig. 15. The length of time that the work spindle is locked against rotation during each cycle or cam shaft rotation, is predetermined and set by the angular spacing of the high points 26a, 27a, of the cams 26, 27, around the cam shaft as a center.

Where an automatic lathe or screw machine of the general type disclosed is equipped with our instant invention, the cam means controlling the reciprocation of the headstock, for instance cam d, is so formed as not to cause headstock reciprocation during the periods that the work spindle is locked against rotation. In other words, the rotating cam d, controls the longitudinal movements of the head stock through the medium of rocker or other mechanism common in the art, controlled by said rotating cam. This rotating cam is formed with a "dwell" or inactive portion that for a predetermined period, during each rotation, ceases to actuate said rocker or other mechanism and permits said headstock to cease its longitudinal movements during said period. Thus, this "dwell" portion of said rotating cam, is so coordinated with respect to the rotating cam means 26, 27, that when said cam means operate the bell crank rocker 31, 33, 34, to lock the work spindle against rotation, the headstock is held at rest, until the cam means 26, 27, again operate said rocker to release the work spindle and said spindle starts rotating, whereupon, cam d, again causes headstock longitudinal movements.

While a specific example embodiment has been disclosed in detail, for purposes of explanation of the invention, not for purposes of limitation, it is to be understood that the instant inventive concept may be embodied in various modifications and departures, within the spirit and scope of said concept and of the following claims:

What we claim is:

1. In a screw machine, lathe, or the like, of the type including a headstock and a rotary work spindle; a rotary driving member for said work spindle; mechanism for operatively establishing driving relation between said member and said spindle, and for breaking said driving connection and for temporarily locking said spindle against rotation when said driving relation is broken, said mechanism including a sleeve rotating with said spindle and relatively movable back and forth longitudinally of said spindle; means being provided to release said sleeve and spindle for rotation and to establish spindle and sleeve driven relation with said driving member when said sleeve moves to its limit of movement in one direction, and to break said driving relation and lock said sleeve and spindle against rotation when said sleeve moves to its limit of movement in the opposite direction; and sleeve actuating and controlling mechanism including, a relatively movable element substantially concentric with the axial line of said spindle for longitudinally impelling said sleeve in either direction, said element provided with a projecting arm for rotating the same on said axial line in either direction, and means being provided for converting said rotary movements into longitudinal movements of said element to propel said sleeve longitudinally in either direction.

2. In a screw machine, lathe, or the like of the type including a headstock and a rotary work spindle; clutch sleeve means concentric and rotatable with and being movable longitudinally of said spindle to temporarily lock said spindle against rotation and to release the same for rotation, said clutch sleeve means providing spaced elements movable longitudinally therewith; a propelling member for said clutch sleeve mounted between and in abutting relation to said elements for movement relative thereto to propel said sleeve means longitudinally in either direction, said propelling member being movable longitudinally with respect to the axial line of the spindle and being centered about said spindle for arcuate movement in either direction therearound between and relative to said spaced elements, said propelling member being provided with an actuating arm projecting substantially radially therefrom, means associated with said arm for forcing said arm and propelling member in either direction longitudinally of said spindle upon arcuate movements of said member on said sleeve around said spindle as a center; a toggle of which said actuating arm forms one toggle arm; and actuating and controlling means for breaking said toggle to swing said actuating arm in one direction to move said sleeve means to its limit of movement in that direction and to break said toggle in the opposite direction to reverse the swing of said arm and to thereby propel said clutch sleeve means to its limit of longitudinal movement in the opposite direction.

3. A screw machine, lathe and the like of the type including a rotary work spindle; a clutch sleeve mounted on said rotary work spindle concentric therewith for rotation with the said spindle, said clutch sleeve being relatively movable longitudinally of said work spindle; a rotary driving member for said sleeve and spindle; a clutch part complementary to a clutch part of said clutch sleeve for establishing driving relation between said driving member and said sleeve and spindle when said clutch sleeve is at its limit of longitudinal movement in one direction; a clutch part complementary to another clutch part of said sleeve for engagement therewith to lock said sleeve and spindle against rotation when said sleeve is at its limit of longitudinal movement in the opposite direction with said sleeve operatively disconnected from said rotary driving member; and mechanism for actuating and controlling said longitudinal movements of said sleeve comprising, a clutch sleeve propelling element movable in either direction longitudinally of said clutch sleeve and angularly movable concentrically with respect to the axis of said spindle, means associated with said sleeve propelling element for forcing said element and the sleeve in either direction longitudinally of said rotary work spindle upon angular movement of said propelling element in either direction around the axis of said spindle; a toggle mechanism for actuating said sleeve propelling element, the pivot of the joint of said toggle mechanism being parallel with the axis of said spindle, said toggle mechanism including spring means constantly acting on said clutch sleeve when the latter is at its limit of longitudinal movement in either direction to hold engaged clutch parts in tight engagement; and means operatively associated with said toggle mechanism for breaking said toggle mechanism first in one direction and then in the opposite direction.

4. In a screw machine, lathe or the like of the type including a headstock and a rotary work spindle; mechanism for temporarily locking said work spindle against rotation and for releasing the same for rotation during each operative cycle, said mechanism including a rotary spindle driving member; clutch means operatively associated with said spindle and relatively movable longitudinally of said spindle to its limit of movement in one direction to position releasing said spindle from said driving member and to lock said spindle against rotation, and to its limit of movement in the opposite direction to release said spindle for rotation and restore driving relation between said spindle and said driving member; means carried by said clutch means for propelling the said clutch means on its operative strokes, said propelling means being relatively movable angularly with respect to the axial line of said spindle and being provided with an actuating lever arm fixed thereto and constituting one arm of a toggle; the other arm of said toggle being pivotally joined to said first mentioned fixed arm by a transverse pivot parallel with the longitudinal axis of the spindle; spaced posts rigid with said headstock; a transverse pivot pin carried by said posts and forming the pivot for said second named toggle arm; a push and pull link connected to said toggle joint for breaking said toggle joint beyond dead center first in one direction and then in the other direction; and means for actuating and controlling said push and pull link.

5. In a screw machine, lathe or the like of the type including a headstock and a rotary work spindle; a longitudinally hollow hub or housing forming a rearward longitudinal continuation of said headstock, the rear end portion of said rotary work spindle housed within and extending through said hollow hub or housing; a rotary spindle driving member mounted for idling rotation; and mechanism for operatively establishing driving relation between said rotary driven member and said spindle, and for breaking said driving connection and for temporarily locking said spindle against rotation when said driving relation is broken, said mechanism including, a clutch sleeve mounted on said spindle substantially within said hollow hub or housing for rotation with said spindle and being relatively movable back and forth longitudinally of the said spindle to establish spindle and sleeve driven relation with said driving member when said sleeve moves to its limit of movement in one direction, and for breaking said driving relation and locking said sleeve and spindle against rotation when said sleeve moves to its limit of movement in the opposite direction, an anti-friction bearing forming a main bearing for the rear end portion of said spindle mounted on said clutch sleeve concentric therewith between the internal wall of said hollow hub or housing and the said spindle, and means for actuating and selectively controlling the movements of said clutch sleeve longitudinally of said rotary work spindle.

6. In a screw machine, lathe or the like of the type including a headstock, and a rotary work spindle; a longitudinally hollow hub or housing forming a rearward longitudinal continuation of said headstock and housing the rear end portion of said rotary work spindle, said hollow hub having the internal surface thereof concentric with said spindle and having the rear end portion of said internal surface formed to provide an annular fixed clutch part concentric with said spindle, a rotary spindle driving member concentric with said spindle and mounted for idling rotation thereon forward of said housing, said rotary spindle driving member being formed to provide an annular clutch part concentric with said spindle and positioned adjacent the forward end portion of said hollow hub, a clutch sleeve mounted on and concentric with the rear end portion of said rotary work spindle substantially within said hollow hub for rotation with said spindle, said clutch sleeve being provided with a clutch part at the rear end thereof adjacent and complementary to said fixed clutch part formed at the rear end portion of said hollow hub, and another clutch part at the forward end thereof adjacent and complementary to said driving member clutch part at the forward portion of said hollow hub, said clutch sleeve being relatively longitudinally movable back and forth between the fixed clutch part of said hollow hub and the clutch part of said rotary spindle driving member to operatively engage either set of complementary clutch parts, respectively, while operatively disengaging the other set of complementary clutch parts; an anti-friction bearing unit mounted on and concentric with said clutch sleeve within said hollow hub between the internal surface of said hollow hub and said sleeve to form a bearing for said rotary work spindle, and said bearing unit being longitudinally movable in said hub with said clutch sleeve as the latter is moved longitudinally back and forth between its limits of longitudinal movement in either direction; and mechanism for actuating said clutch sleeve and for selectively controlling the longitudinal movements thereof.

7. In a screw machine, lathe or the like of the type including a headstock and a rotary work spindle; a longitudinally hollow hub or housing fixed to said headstock in substantial longitudinal continuation thereof, said rotary work spindle extending into and through said hub or housing with the internal wall of the said hub or housing surrounding and spaced from that portion of the rotary spindle housed therein; a rotary driving member for said spindle mounted for idling rotation with respect to said spindle; a sleeve member rotatable with said spindle and mounted thereon substantially within said hollow hub or housing, said sleeve member being concentric with and being relatively longitudinally movable on said spindle in one direction to operatively lock said driving member to rotate said spindle and to release said spindle for rotation, and in the opposite direction to break the driving relation from said driving member to said spindle and to temporarily lock said spindle against rotation; an anti-friction bearing unit mounted on said sleeve member concentric therewith within said hub or housing between said sleeve member and the said hub or housing to form a main bearing for said rotary work spindle; and means for actuating and selectively controlling the longitudinal movements of said sleeve member with respect to said rotary work spindle.

8. In a screw machine, lathe or the like of the type including a headstock and a rotary work spindle; a hollow hub or housing fixed to said headstock in substantial longitudinal continuation thereof, said rotary work spindle extending into and through said hollow hub or housing and the internal surface of said hollow hub or housing being concentric with said rotary work spindle, a rotary driving member for said spindle mounted for idling rotation with respect to the said spindle; a sleeve member mounted on said spindle concentric therewith and being substantially housed within said hollow hub, said sleeve member being rotatable with said spindle and being relatively movable thereon longitudinally thereof in one direction to operatively lock said rotary driving member to rotate said spindle and to release the said spindle for rotation, and in the opposite direction to break the driving relation from said rotary driving member to said spindle and to temporarily lock said spindle against rotation; an anti-friction bearing unit mounted on said sleeve member concentric therewith within said hollow hub or housing between said sleeve member and the concentric internal wall surface of said hollow hub or housing, said bearing unit being longitudinally movable with said sleeve member longitudinally of said hollow hub and said rotary work spindle and including a ring member concentric with said sleeve member and rotatable relative to said bearing unit about the axis of said rotary spindle as a center; said ring member being provided with an actuating arm projecting substantially radially therefrom for rotating said ring member about said rotary spindle as an axis in either direction; and means for converting rotary movements of said ring member into longitudinal movements of said sleeve member to move the said sleeve member longitudinally of said rotary work spindle in either direction.

9. A screw machine, lathe or the like of the type including a rotary work spindle; a clutch sleeve mounted on said rotary work spindle concentric therewith for rotation with the said spindle, said clutch sleeve being relatively movable longitudinally of said work spindle; a rotary driving member for said spindle mounted for idling rotation with respect to said spindle, said rotary driving member being provided with a clutch part; a clutch part on said clutch sleeve complementary to the clutch part of said rotary driving member for establishing driving relation between said driving member and said clutch sleeve and spindle when said clutch sleeve is at its limit of longitudinal movement in one direction; a fixed clutch part complementary to another clutch part of said clutch sleeve for engagement therewith to lock said sleeve and spindle against rotation when said sleeve is at its limit of longitudinal movement in the opposite direction with said sleeve operatively disconnected from said rotary driving member; mechanism for actuating and controlling said longitudinal movements of said clutch sleeve comprising, a clutch sleeve propelling element movable in either direction longitudinally of said clutch sleeve and angularly movable concentric with respect to the axis of said spindle, means associated with said sleeve propelling element for forcing said element and the sleeve in either direction longitudinally of said rotary work spindle upon angular movement of said propelling element in either direction around the axis of said rotary work spindle; a toggle mechanism for acuating said sleeve propelling element, the pivot of the joint of said toggle mechanism being parallel with the axis of said rotary work spindle, said toggle mechanism including spring means constantly acting on said clutch sleeve when the latter is at its limit of longitudinal movement in either direction to hold engaged clutch parts in tight engagement, and means operatively associated with said toggle mechanism for breaking said toggle mechanism first in one direction and then in the opposite direction, said means including rotary cam means providing high points angularly spaced apart around the axis of rotation of said cam means, and a transmission from said rotary cam means to said toggle mechanism for breaking the latter in one direction under the actuating force of one of the high points of said cam means and for breaking said toggle mechanism in the opposite direction under the actuating force of the other high point of said cam means.

10. In a screw machine, lathe or the like, of the type including a headstock and a rotary work spindle; a rotary driving member for said work spindle, said driving member being mounted for idling rotation; mechanism for operatively establishing driving relation between said rotary driving member and said spindle, and for breaking said driving relation and for temporarily locking said spindle against rotation when said driving relation is broken, said mechanism including a sleeve rotating with said spindle and relatively movable back and forth longitudinally on said spindle, means for releasing said sleeve and spindle for rotation and for establishing spindle and sleeve driven relation with said driving member when said sleeve moves to its limit of movement in one direction and to break said driving relation and lock such sleeve and spindle against rotation when said sleeve moves to its limit of movement in the opposite direction, sleeve acuating and controlling mechanism including, an element mounted concentric with the axis of said spindle and being rotatable relative to said sleeve about the spindle axis as a center, said element being movable with said sleeve in either direction longitudinally of said spindle and being provided with a projecting arm for rotating said element in either direction, and means for converting rotary movements of said element into longitudinal movements thereof to propel said sleeve longitudinally in either direction; a toggle mechanism for actuating said sleeve propelling element, the pivot of the joint of said toggle mechanism being parallel with the axis of said rotary work spindle, said toggle mechanism including spring means constantly acting on said sleeve when the latter is at its limit of longitudinal movement in either direction to hold said sleeve in such limit position; and means operatively associated with said toggle mechanism for breaking said toggle mechanism first in one direction and then in the opposite direction.

11. In a screw machine, lathe or the like including a headstock and rotary work spindle; a longitudinally hollow hub or housing forming a part of said headstock in substantial longitudinal continuation thereof, said rotary work spindle extending into and through said hollow hub with the internal surface of said hub surrounding and being spaced from that portion of the rotary work spindle housed therewithin; a rotary driving member for said spindle mounted for idling rotation with respect to the said spindle; a sleeve member mounted on said spindle concentric therewith and being located and substantially housed within said hollow hub, said sleeve member being rotatable with said spindle and being relatively movable thereon longitudinally thereof in one direction to operatively lock said rotary driving member to rotate said spindle and to release the said spindle for rotation, and in the opposite direction to break the driving relation from said rotary driving member to said spindle and to temporarily lock such spindle against rotation; a sleeve propelling member mounted thereon for movement therewith longitudinally of said spindle and being rotatable on and relative to said sleeve about the axis of said spindle as a center, said sleeve propelling member being provided with an actuating arm projecting substantially radially therefrom for rotating said member relative to said sleeve in either direction around the axis of said spindle as a center, said hollow hub providing a wedging slot thereon diagonally disposed relative to and extending across the axial line of said spindle, said actuating arm of said sleeve propelling member being slidably received in the said wedging slot of said hub member; and mechanism operatively connected with said actuating arm for swinging said arm and rotating said propelling member about the axis of said rotary spindle to cause said diagonally disposed wedging slot to force said arm and propelling member laterally to move the said sleeve longitudinally of said spindle.

WALTER E. KLEMA.
HARRY SORENSON.

REFERENCES CITED

The following references are of record in the file of this patent:

UNITED STATES PATENTS

| Number | Name | Date |
|---|---|---|
| 1,328,145 | Foster | Jan. 13, 1920 |
| 1,879,546 | Seibert, et al. | Sept. 27, 1932 |
| 2,004,055 | Peets, et al. | June 4, 1935 |
| 2,127,186 | Perkins | Aug. 16, 1938 |
| 2,319,963 | Wilson, et al. | May 25, 1943 |
| 2,343,914 | Lloyd | Mar. 14, 1944 |

FOREIGN PATENTS

| Number | Country | Date |
|---|---|---|
| 13,078 | British | 1896 |
| 7,147 | British | 1915 |
| 77,412 | Swiss | Apr. 16, 1918 |